United States Patent
Rivain et al.

(10) Patent No.: US 8,473,751 B2
(45) Date of Patent: Jun. 25, 2013

(54) METHOD FOR CRYPTOGRAPHIC DATA PROCESSING, PARTICULARLY USING AN S BOX, AND RELATED DEVICE AND SOFTWARE

(75) Inventors: Matthieu Rivain, Paris (FR); Emmanuel Prouff, Paris (FR)

(73) Assignee: Oberthur Technologies, Columbes (FR)

( * ) Notice: Subject to any disclaimer, the term of this patent is extended or adjusted under 35 U.S.C. 154(b) by 384 days.

(21) Appl. No.: 12/667,053

(22) PCT Filed: Dec. 13, 2007

(86) PCT No.: PCT/FR2007/002061
§ 371 (c)(1),
(2), (4) Date: May 11, 2010

(87) PCT Pub. No.: WO2009/074726
PCT Pub. Date: Jun. 18, 2009

(65) Prior Publication Data
US 2011/0055591 A1   Mar. 3, 2011

(51) Int. Cl.
G06F 11/30 (2006.01)
(52) U.S. Cl.
USPC .............................................. 713/189; 380/28
(58) Field of Classification Search
USPC .................. 380/28–30; 713/189–193
See application file for complete search history.

(56) References Cited

U.S. PATENT DOCUMENTS

| | | | |
|---|---|---|---|
| 5,214,701 A * | 5/1993 | Quisquater et al. | 380/29 |
| 6,295,606 B1 * | 9/2001 | Messerges et al. | 713/189 |
| 6,792,111 B1 * | 9/2004 | Italia et al. | 380/263 |
| 7,668,310 B2 * | 2/2010 | Kocher et al. | 380/37 |
| 7,965,836 B2 * | 6/2011 | Ahn et al. | 380/28 |
| 2001/0038693 A1 * | 11/2001 | Luyster | 380/37 |

(Continued)

FOREIGN PATENT DOCUMENTS

| | | |
|---|---|---|
| EP | 1 601 132 A1 | 11/2005 |
| EP | 1 833 190 A1 | 9/2007 |

(Continued)

OTHER PUBLICATIONS

International Search Report, dated Oct. 15, 2008, from corresponding PCT application.

(Continued)

*Primary Examiner* — Brandon Hoffman
*Assistant Examiner* — Carlos Amorin
(74) *Attorney, Agent, or Firm* — Young & Thompson (57) ABSTRACT

A method for data cryptographic processing, that is implemented by an electronic entity and includes the conversion of input data (M'i−1), masked by an input mask (X), into output data, the conversion using a conversion table (S), and the method including the following steps: for at least one plurality of possible values (A) for the input mask (X), transferring the output value of the conversion table (S) corresponding to the masked input data (M'i−1) converted by the application of an unmasking operation using the possible value (A), into a table (T) at a position corresponding to a determined value (0) masked by the input mask (X) and converted by the application of an unmasking operation using the possible value (A); determining the output data using the value located in the table (T) at the position corresponding to the determined value (0).

19 Claims, 7 Drawing Sheets

U.S. PATENT DOCUMENTS

| | | |
|---|---|---|
| 2006/0056622 A1* | 3/2006 | Liardet et al. .................. 380/28 |
| 2006/0104438 A1 | 5/2006 | Giraud |
| 2007/0058800 A1* | 3/2007 | Neisse et al. .................. 380/28 |
| 2007/0206785 A1* | 9/2007 | Romain .......................... 380/28 |
| 2007/0263859 A1* | 11/2007 | Teglia et al. ................... 380/29 |
| 2007/0286413 A1* | 12/2007 | Derouet .......................... 380/28 |
| 2008/0019503 A1* | 1/2008 | Dupaquis et al. .............. 380/28 |
| 2008/0222427 A1* | 9/2008 | Baentsch et al. ............. 713/189 |
| 2008/0253557 A1* | 10/2008 | Dottax et al. .................. 380/28 |
| 2008/0285745 A1* | 11/2008 | Teglia et al. ................... 380/29 |
| 2009/0034718 A1* | 2/2009 | Lin .................................. 380/29 |
| 2009/0086976 A1* | 4/2009 | Scian ............................ 380/277 |
| 2012/0144205 A1* | 6/2012 | Shu et al. ...................... 713/189 |

FOREIGN PATENT DOCUMENTS

| | | |
|---|---|---|
| WO | 9935782 A1 | 7/1999 |
| WO | 9967909 A2 | 12/1999 |
| WO | WO 2007/116140 A1 | 10/2007 |

OTHER PUBLICATIONS

Prouff, E. et al, "A Generic Method for Secure SBox Implementation". from "Lecture Notes in Computer Science", published after the 8th International Workshop on Information Security Applications (WISA) 2007, Aug. 27-29, 2007, vol. 4867, Jeju Island, Korea.

* cited by examiner

METHOD FOR CRYPTOGRAPHIC DATA PROCESSING, PARTICULARLY USING AN S BOX, AND RELATED DEVICE AND SOFTWARE

BACKGROUND OF THE INVENTION

1. Field of the Invention

The invention concerns a method for cryptographic data processing and a related device and related software.

2. Description of the Related Art

In such methods, data is frequently masked in order to combat attacks, for example of the current analysis type (particularly attacks of the differential power analysis (DPA) type or the electromagnetic radiation analysis type).

Masking techniques combine the data item (i.e. in practice the number) to be used (in practice which is to be subjected to an operation) with a number that an external attacker cannot predict (generally a random or pseudo-random number); thus the values involved are different each time even using a constant input data item, which makes it impossible for the attacker to deduce the internal data of the process (and particularly the cryptographic keys that it uses) on the basis of external measurements.

Part of cryptographic security is achieved by the use of non-linear functions. For example, it is routine to model a block cipher by combining affine functions and non-linear functions. The production of such non-linear functions is particularly difficult to protect by masking because of the non-linearity vis à vis the masking operation.

One example of a cryptographic processing method is described in international patent application WO 2007/116140 and applies to this masked data a non-linear function of the S-box (substitution box) type.

Such S-boxes are in practice implemented by means of a substitution table (often referred to as an S-table or look-up table (LUT)) stored in the cryptographic device.

The solution proposed in the above document may nevertheless be unsuitable if it is required to avoid the use of a large number of summations.

BRIEF SUMMARY OF THE INVENTION

In the above context, the invention provides a method of cryptographic processing of data represented in digital form, the method being executed by an electronic entity and comprising a transformation of an input data item masked by an input mask into an output data item, said transformation using a conversion table, characterized by the following steps:

for at least one plurality of possible values for the input mask, transfer of the output value from the conversion table corresponding to the masked input data item transformed by application of a demasking operation by means of the possible value into a table at a position corresponding to a particular value masked by the input mask and transformed by application of the demasking operation by means of the possible value;

determination of the output data item by means of the data item situated in the table at the position corresponding to the particular value.

Thus at least part of the conversion table is reorganized in the table so that the required output value (which corresponds in this conversion table to the input value without masking and where appropriate is masked) is placed in the table at the position defined by the value that has been determined.

However, because a plurality of possible values for the mask is processed and the reorganization effected depends at least on the input mask, the method is protected against attacks.

For example, the conversion table in practice defines a non-linear function such as that within an S-box.

The input mask can be a first order mask, for example the application of a random value, or a second order mask, corresponding to the successive application of a first random value and then a second random value. In this case, the value determined can be masked by the input mask by means of the following steps:

masking by a first mask element;
masking by a second mask element.

To enhance the security of outputs from the conversion table, the transfer step can comprise masking of the transferred value by an output mask which where appropriate is different from the input mask, for example by means of first or second order masking.

In this latter case, the application of the output mask can be effected by means of the following steps:

masking by a first random value;
masking by a second random value.

In an embodiment described hereinafter, the transfer step is effected for all possible values of the input mask, so that no special value appears externally and there is therefore no leakage of information at this level.

Moreover, the value determined (defining as indicated above the position of interest in the table) can be a predetermined value (for example for simplification) or a value drawn at random, which further enhances security because the position of interest in the table in this case varies on each use.

The electronic entity is adapted to manipulate the processed digital data, for example by means of a microprocessor.

The method is, for example, a method for encrypting or decrypting digital data, generally representing a message, but also potentially a cryptographic key, an intermediate data item or only a portion of such elements.

In practice binary masks are used that are the same length as the input binary data item. Thus the set of binary masks corresponds to the set of inputs of the S-box (S-table).

The binary masks associated with a Boolean addition function have the advantage of constituting a simple involutional masking function enabling the input data item value to be retrieved when masked twice using the same mask.

The invention thus applies to any order of masking, i.e. whatever the number of random masks applied to the data item.

In particular, the masking function can be commutative, enabling double (or even greater) masking to be used whatever the order in which the input or output masks are applied (see below).

In a particularly beneficial embodiment, said masks can be additive masks, for example Boolean masks. Thus Boolean addition can easily be implemented using EXCLUSIVE-OR (XOR) functions.

In an embodiment using a long machine word and grouping a plurality of output sub-words, said data item situated in the table is a word that comprises a plurality of output sub-words and determining the output data item can then include a step of access to the output data item among the sub-words by means of part of the input data item and part of the input mask.

In this context, the step of accessing the output data item in said word includes, for example:

i) a step of separating said word into two halves, respectively the more significant bits and the less significant bits, ii) a step of selecting one of said halves of said word as a function of the values of the bits with the same index in the part of the input data item and the part of the input mask, respectively.

The method is for example implemented by a sequence of instructions stored in the electronic entity and executed by a microprocessor of the electronic entity.

The electronic entity can in practice be a microcircuit card particularly adapted to this type of secure operation.

The invention also proposes an electronic device for cryptographic processing of data represented in digital form, adapted to effect a transformation of an input data item, masked by an input mask, into an output data item by means of a conversion table, characterized by:

means for transferring, for at least one plurality of possible values for the input mask, the output value from the conversion table corresponding to the masked input data item transformed by application of a demasking operation by means of the possible value into a table at a position corresponding to a particular value masked by the input mask and transformed by application of the demasking operation by means of the possible value;

means for determining the output data item by means of the data item situated in the table at the position corresponding to the particular value.

This device can also have features corresponding to the above embodiments of the method.

The invention finally proposes a computer program product including a series of instructions adapted, when they are executed by a microprocessor, to implement the above method.

The particular advantages, aims and features of this electronic device and this computer program product being similar to those of the method of the present invention, as outlined hereinabove, they are not repeated here.

BRIEF DESCRIPTION OF THE DRAWINGS

Other particular advantages, aims and features of the present invention emerge from the following explanatory and nonlimiting description given with reference to the appended drawings, in which.

DETAILED DESCRIPTION OF THE PREFERRED EMBODIMENTS

Figure 1:
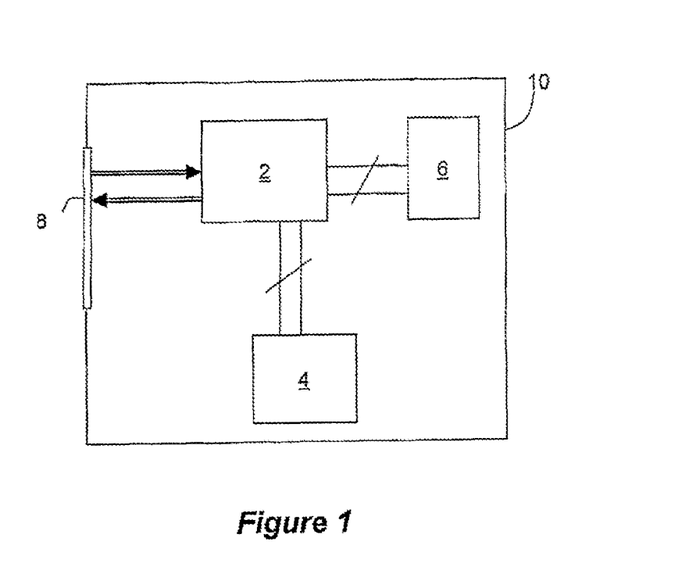
FIG. 1 represents diagrammatically the main elements of one possible embodiment of a microcircuit card.

One example of an electronic entity is a microcircuit card 10 the main electronic elements of which are represented in FIG. 1 and include a microprocessor 2 connected on the one hand to a random access memory (RAM) 4 and on the other hand to a rewritable non-volatile semiconductor memory 6, for example an electrically erasable programmable read only memory (EEPROM). Alternatively, the semiconductor rewritable non-volatile memory 6 could be a flash memory.

The memories 4, 6 are each connected to the microprocessor 2 by a bus in FIG. 1; alternatively, there could be a common bus.

The microcircuit card 10 also includes an interface 8 for communication with a user terminal here taking the form of contacts one of which provides for example a bidirectional connection with the microprocessor 2. Thus the interface 8 sets up bidirectional communication between the microprocessor 2 and the user terminal into which the microcircuit card 10 is inserted.

Thus upon insertion of the microcircuit card 10 into a user terminal, the microprocessor 2 executes an operating process of the microcircuit card 10 in accordance with a set of instructions which is stored for example in a read-only memory (ROM)—not shown—or in the rewritable memory 6 and which defines a computer program. This method generally includes the exchange of data with the user terminal via the interface 8 and the processing of data within the microcircuit card 10, specifically within the microprocessor 2, where appropriate using data stored in the rewritable memory 6 and data stored temporarily in the random access memory 4.

Examples of methods that implement the invention are given hereinafter.

Figure 2:
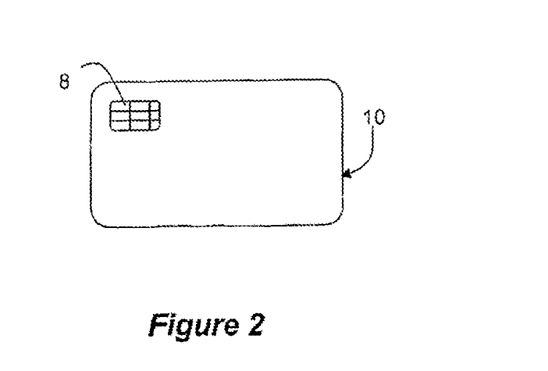
FIG. 2 represents the general physical appearance of the FIG. 1 microcircuit card.

FIG. 2 represents the general physical appearance of the microcircuit card 10, which is produced with the general shape of a rectangular parallelepiped of very small thickness.

The communication interface 8 provided with the contacts already referred to is clearly apparent on the face of the microcircuit card 10 visible in FIG. 2, in the form of a rectangle inscribed in the upper face of the microcircuit card 10.

Embodiments of the invention are described next with reference to an advanced encryption standard (AES) cryptographic algorithm shown in block diagram form in FIG. 3.

It is nevertheless understood that the invention can for example be applied in the case of other algorithms implying a non-linear function, such as the DES algorithm, for example with the use of block ciphers. The mask or masks applied to the input data of the non-linear function is/are not necessarily the X mask or masks applied at the beginning of the algorithm, but are generally easily deduced therefrom by the mechanisms of the algorithm, for example as referred to in the application WO 2007/116140 referred to above.

Figure 3:
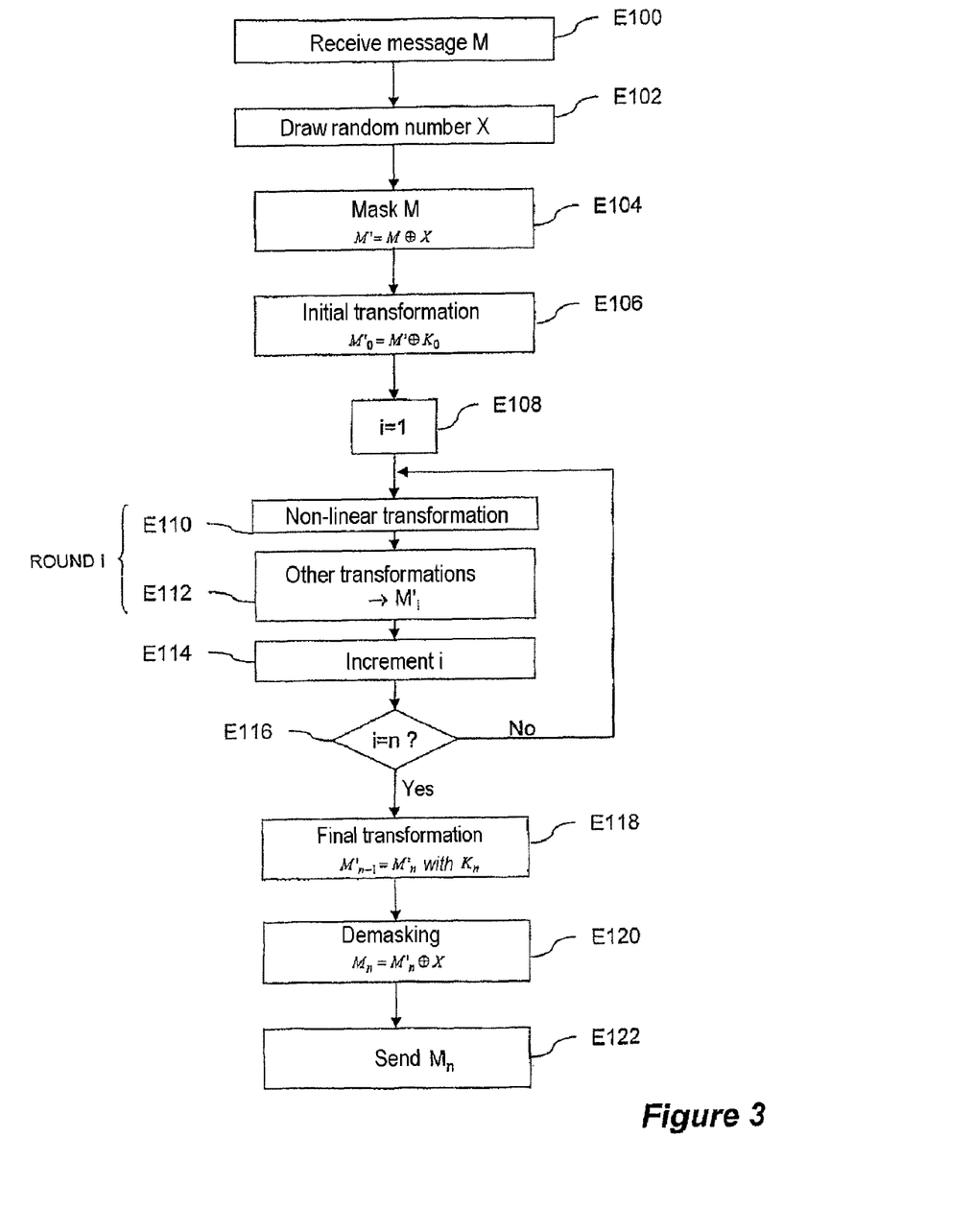
FIG. 3 represents in flowchart form the essential steps of an encryption process according to the AES algorithm with masking.

FIG. 3 represents the essential steps of the process of AES encryption of a word M within the electronic entity.

The word M is generally part of a message to be encrypted having a length of 128 bits, for example. Other lengths can naturally be envisaged, such as the lengths of 192 bits and 256 bits frequently used.

The example described here employs as the electronic entity the microcircuit card described above with reference to FIGS. 1 and 2, but other types of electronic entity can naturally be employed, for example a personal computer.

To this end, the electronic entity stores, for example in the non-volatile memory 6, a cryptographic key K from which sub-keys $K_0, \ldots K_n$ are derived by means of a key expansion procedure.

The sub-keys $K_0, \ldots K_n$ can be obtained using techniques known in the art that are therefore not described in detail here. See for example patent application FR 2 838 262.

Note however that the invention as described hereinafter for calculation at the level of the S-boxes involved in each iteration (or ROUND) of the AES algorithm could be implemented on application of the non-linear function employed in the algorithm for deriving the sub-keys $K_0, \ldots K_n$.

The encryption process begins in the step E100 by reception of the word (generally a message portion) M to be encrypted, for example via the interface 8 of the microcircuit card.

This is followed within the electronic entity by drawing a random number X used as a mask for the word M during a step E102. Although the expression "random number" is used, it is in practice a pseudo-random number determined within the microprocessor 2, for example. Generally speaking, the number X and any data item referred to hereinafter as random must be a number that cannot be predicted externally of the electronic entity.

Then during a step E104 the word M is masked in order to obtain a masked word M' by combining the word M and the random number X by means of an EXCLUSIVE-OR (XOR) operation: $M'=M \oplus X$.

When a simple mask is used to mask a data item (first order mask), the leakage of information on the masked data item can be targeted jointly with the leakage of information on the mask in order to retrieve information on the data item in clear. This type of attack, commonly called a second order attack, can be prevented by the use of a second mask (second order masking).

Thus instead two masks $X_1$ and $X_2$ can be generated for double masking of the message M: $M'=(M \oplus X_1) \oplus X_2$. This configuration protects the message M against second order leakage. There is particularly described hereinafter an embodiment of the invention using such double masking.

Hereinafter, magnitudes with the prime symbol (for example M') denote masked values whereas magnitudes with no prime symbol represent the corresponding magnitudes without masking, i.e. such as would be obtained by executing the AES algorithm without masking; these magnitudes without masking are introduced here for purposes of explanation, but are not manipulated by the method described here, which employs their masked version, except of course for the magnitudes M and $M_n$ employed at the input and the output, respectively.

There follow the various steps of the AES algorithm using the masked data item M' in the steps described hereinafter which correspond to the standard steps of the AES algorithm adapted to take account of the masking.

Thus there follows first of all the initial transformation by means of the sub-key $K_0$ during a step E106 by applying the key $K_0$ to the data item by means of an EXCLUSIVE-OR operator: $M'_0=M' \oplus K_0$.

If $M_0$ denotes the result of the initial transformation without masking ($M_0=M \oplus K_0$), note that the result $M'_0$ of the step E106 can be written $M'_0=M_0 \oplus X$. Note that the result of the step E106 therefore corresponds to the result of the initial transformation without masking, masked by the value of the mask X.

There follows after the initial transformation a step E108 of initializing to 1 an index i hereinafter identifying the iteration (or ROUND) concerned.

In the step E110, the masked word $M'_{i-1}$ obtained in the preceding step (step E106 after the initial transformation or preceding iteration) is subjected to an iteration (ROUND) of the steps E110 and E112, in order to obtain a new masked word $M'_i$.

Each iteration can be such that the result obtained after the iteration $M'_i$ is equal to the result $M_i$ after the iteration i in an algorithm with no masking, masked with a mask X identical to that introduced in the step E104, i.e. in order that after each iteration $M'_i=M_i \oplus X$.

Alternatively, the masking can be modified on each iteration, for example by remasking it with a new mask Z as described hereinafter.

Once the iteration or ROUND i has been carried out, the value of the index i is incremented during a step E114, after which during a step E116 there is tested the equality i=n where n is one plus the number of iterations used in the algorithm concerned (generally 10 iterations for a word of 128 bits).

If the last iteration has not be achieved (i.e. if the equality i=n is not verified), the process returns to the step E110 to effect the next iteration.

On the other hand, if the last iteration is reached (i.e. if i=n is verified), there follows the final transformation during a step E118 in which a word $M'_n$ is thus obtained from the word $M'_{n-1}$ previously obtained, using the sub-key $K_n$ (step E118).

Thus the result of the final transformation $M'_n$ corresponds to the encrypted word obtained using the AES algorithm from the initial word M masked using the previously defined mask X (or the last intermediate mask Z generated if it is required to modify the masking during the iterations).

There follows in the step E120 the demasking of the word obtained in the step E118 in order to obtain the encrypted word $M_n$: $M_n=M'_n \oplus X$ (or where appropriate with the mask Z).

The encrypted word $M_n$ can then be output from the electronic entity via the interface 8 during a step E122 that terminates the process of encryption of the word M by the electronic entity.

The present invention relates more precisely to using S-boxes during iteration of the steps E110 and E112.

In the cryptography field, the transformation $M'_{i-1} \rightarrow M'_i$ can be modeled by the composition of three operations: an additive function of the derived key $K_i$, a non-linear function, and a linear function.

The step E110 shows the application of the non-linear function by the use of an S-box and described in more detail hereinafter with reference to the embodiments.

The step E112 then corresponds to the application of the other two functions, one example of which is proposed in the application WO 2007/116140 referred to above in relation to its FIG. 4, particularly sub-block bit shifting steps (also known as Shift Row), multiplication by a matrix (also called Mix Column) and addition of the key $K_i$ (Add Round Key) steps.

To carry out the step E110, the S-table is stored in the non-volatile memory 6, also called a conversion table (lookup table (LUT)). The conversion table S receives input data of dimension (i.e. number of bits) m and supplies output data of dimension n, and in particular m can be equal to n. The invention applies equally if these two dimensions are different.

A first embodiment of the step E110 is described next with reference to FIG. 4.

In this figure, the step E110 is implemented in the form of a subroutine that receives as input the masked data item $M'_{i-1}$ and the mask X used for masking (step E200).

There is then initialized, for example to the value zero, a variable A that corresponds to one possible value of the mask X, as explained hereinafter (step E202).

By possible value is meant one of the values that the mask X can take, which mask constitutes a random value (see above).

In the step E205 there is read the value stored in the conversion table S at the position defined by the masked data item $M'_{i-1}$ to which there has previously been applied (with a view to demasking it where applicable) the variable A by means of the operation $M'_{i-1} \oplus A$. The value $S(M'_{i-1} \oplus A)$ is thus read in the step E205.

Note that, in the example described here, the algorithm used for masking, like that used for demasking, applies an exclusive-OR (Boolean summation) operation, routinely used for this purpose thanks to its involutional properties.

There follows, still in the step E205, the addition of a new mask Z to the value that has just been read, after which the value obtained in this way is stored in a table T at a position defined by the Boolean sum of the mask X and the variable A. The table T is also stored in a memory of the electronic entity, here generally a random access memory to which access is simple and fast.

The new mask Z used is for example also received as input during the step E200. Alternatively, this new mask Z could be determined, for example drawn randomly, during the initialization step E202 referred to above, in which case it is returned during the step E212 described hereinafter. Another alternative, already mentioned, is to use the mask X again at this stage.

When copying the output from the conversion table S defined above into the table T at the position also indicated above is effected, the value of the variable A is incremented (step E208).

It is then verified in the step E210 if the variable A has swept all possible values for the mask X (here by comparing the value of A to $2^m$ because this value was initialized to zero during the step E202).

In the event of negative comparison (i.e. if some possible values for the mask X have not been processed), there is a return to the step E205 for a new iteration of this step with the new value of the variable A.

On the other hand, if the comparison is positive, the value A has successively taken all possible values for the mask X and the value T[0] can then be returned as the result of the step E110 (step E212).

The table T has been filled by the successive iterations of the step E205 so that, when the variable A took the actual value of the mask X, there was read in the conversion table S the value corresponding to the input $M'_{i-1} \oplus X = M_{i-1}$, i.e. the value $S(M_{i-1})$ to be obtained, and this value is placed (after masking by the new mask Z) in the table T at the position $X \oplus X = 0$.

Thus the substitution table S has been reorganized in the table T so that the value of interest ($S(M_{i-1})$) is stored in a particular position (here the position corresponding to a zero value). However, this reorganization has applied to a set of values (here the whole of the conversion table); the reorganization effected further depends on the random mask X and is therefore different each time.

The combination of these effects makes execution of the step E110 more secure.

Note that the term "table" T is used here although the data structure concerned has only one entry, like the conversion table S.

Figure 5:
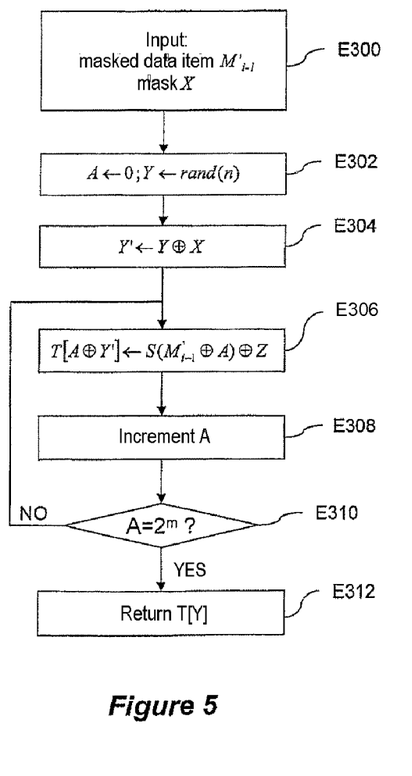
FIG. 5 represents in flowchart form a second embodiment of the invention implemented in the FIG. 3 process.

FIG. 5 shows a second embodiment that can be envisaged for the step E110.

This embodiment is similar to the first embodiment described with reference to FIG. 4; however, the reorganization of the substitution table S into a table T is such that the value of interest in the substitution table S ($S(M_{i-1})$) is not copied (after masking) to a predetermined position (the position corresponding to the zero value in FIG. 4), but to a position determined randomly on each return to the step E110 as indicated hereinafter thanks to the use of a new random value Y, which further enhances security.

The FIG. 5 process begins with reception as input of the masked data item $M'_{i-1}$ and the mask X (step E300) as in the first embodiment described with reference to FIG. 4.

There follows the initialization of the variable A, for example to the zero value, and also here that of a variable Y by drawing at random from a number m of bits equal to that of the mask X (step E302).

To simplify the calculations, there is then calculated during the step E304 an intermediate value Y' equal to masking the random value Y that has just been determined by the mask X received as input: $Y' = Y \oplus X$.

As in the first embodiment, there follows a loop for assigning the variable A all values that can be envisaged for the mask X.

This loop begins in the step E306 in which there is first read in the conversion table S the output value corresponding at the input to the masked data item $M'_{i-1}$ transformed by application of the variable A by means of the demasking operation. Thus the value $S(M'_{i-1} \oplus A)$ is read in the step E306, which value is masked using a new mask Z (which can be determined according to the various possibilities already envisaged for the first embodiment).

The value read and masked is then copied into a table T at a position defined by applying the variable A to the intermediate value Y', also by means of the demasking operation, i.e. the position $A \oplus Y'$.

There can then follow the step E308 during which the value of A is incremented in order to test in the step E310 if the maximum value $2^m$ has been reached: if not, there is a loop to the step E306; if so, the processing of all possible values for the value A is complete and the value copied into the table at the position Y can be returned as output in the step E312.

When the copy step E306 targeted the position Y, the variable A effectively demasked Y masked by means of the mask X (step E304), and thus the same value A demasked the masked data item $M'_{i-1}$ to yield the data item $M_{i-1}$ the output of which is to be read in the conversion table S.

Figure 6:
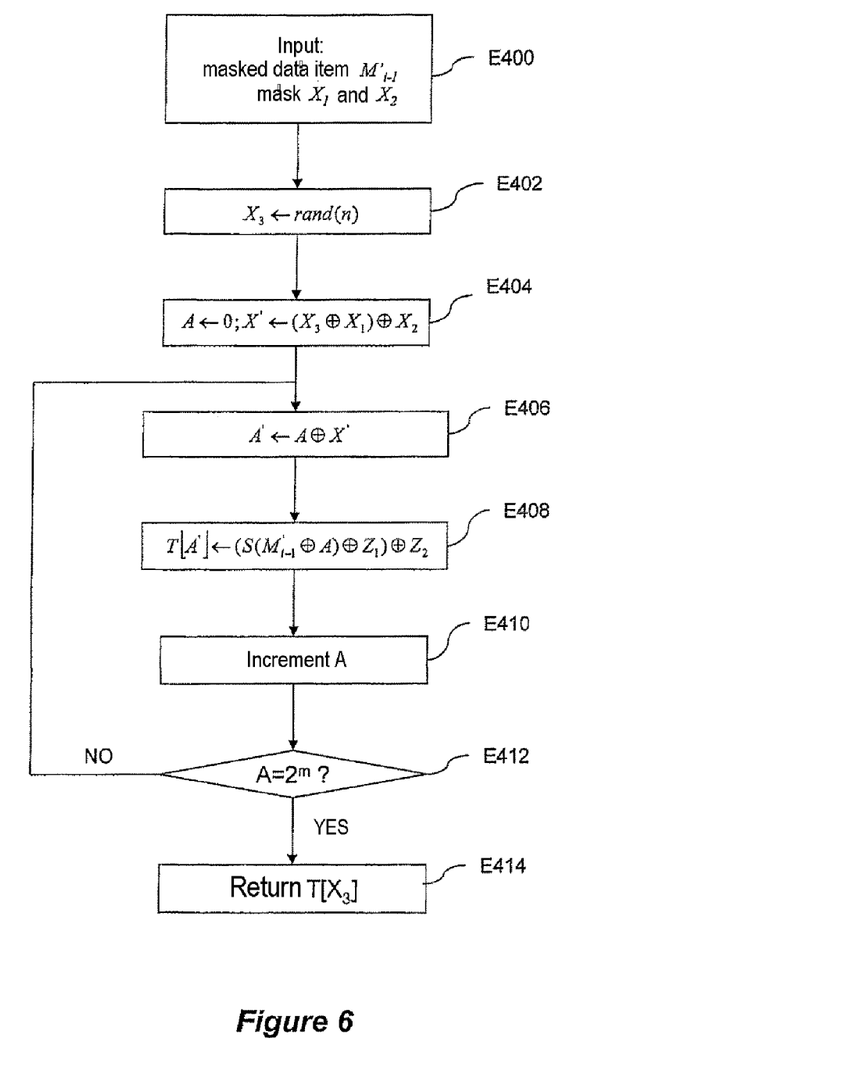
FIG. 6 represents in flowchart form a third embodiment of the invention implemented in the FIG. 3 process.

FIG. 6 represents a third embodiment that can be envisaged for the step E110 from FIG. 3.

This embodiment corresponds to the case where the data item $M_{i-1}$ is second order masked, i.e. masked by using two masks $X_1$ and $X_2$ so that the masked value $M'_{i-1}$ therefore has the value $M_{i-1} \oplus X_1 \oplus X_2$.

In this case, the step E400 receives as input the masked data item $M'_{i-1}$ and the two masks $X_1$ and $X_2$.

In this embodiment, the step E402 first draws randomly a value $X_3$ that comprises the same number of bits m as the masks $X_1$ and $X_2$ (whence the notation rand(m)).

There follows an initialization step E404 in which a variable A is set to the zero value. With a view to simplifying the calculations, there can equally be calculated in this step E404 a value X' equal to the random value $X_3$ previously determined masked successively by the masks $X_1$ and $X_2$, i.e. $X' = (X_3 \oplus X_1) \oplus X_2$.

In this step, the exclusive-OR (XOR) operations must be carried out in the order of the parentheses, i.e. first $X_3 \oplus X_1$, followed by addition of the result and $X_2$. Complying with this order guarantees protection against second order attacks because there is no direct manipulation of the value $X_1 \oplus X_2$ that could then resemble simple (first order) masking of the data item $X_3$.

Once this initialization step has been completed, there follows the step E406 in which an intermediate value A' is determined by application of the variable A to the value X' in order to demask it, i.e. here by the operation A⊕X' (because, as already described in relation to the first embodiment, the masking and demasking operation is effected here by one and the same Boolean summation operation).

There then follows the step E408 which begins with reading in the conversion table S the output value associated with the input value $M'_{i-1} \oplus A$, i.e. the output value corresponding to the masked data item $M'_{i-1}$ transformed by application of the variable A by means of the demasking operation.

The output value obtained in this way $S(M'_{i-1} \oplus A)$ is then successively masked by two masks $Z_1$ and $Z_2$ to achieve second order masking.

As in the first embodiment, the new masks $Z_1$ and $Z_2$ can be entered as arguments (i.e. as input) in the step E400, or alternatively be determined in the initialization step E404 (in which case they are also returned in the step E414 described below).

To prevent second order leakage liable to be detected, there are effected successively as indicated masking by the value $Z_1$ and then, in a second phase, masking by the value $Z_2$.

The value obtained at the output after masking is finally written during this same step E408 into a table T at a position defined by the intermediate value A' (remember that this results from successive application to the random value $X_3$ determined masking by the masks $X_1$, $X_2$ followed by application of the demasking operation with the variable A in the step E406).

There follows the step E410 in which the variable A is incremented, after which the step E412 tests if the value A has reached the maximum possible value for the masks (here $2^m$).

In the event of a negative response, there is a return to the step E406 in order to iterate the steps E406 and E408 with all values for A that can be envisaged.

Finally, in the event of a positive response, there is returned in the step E414 the value $T[X_3]$ corresponding to the data item stored in the table T at the position defined by the random value $X_3$ drawn in the step E402.

The table T has been filled at its position $X_3$ on the iteration of the step E408 corresponding to a value A that enabled effective demasking of $X_3$ masked by the masks $X_1$ and $X_2$ in the step E404: it is therefore the iteration in which the value A was also used to demask the value $M'_{i-1}$ to yield the output value $M_{i-1}$ which is precisely what was looked for in the conversion table S.

This embodiment therefore achieves the advantages referred to above for the embodiments described with reference to FIGS. 4 and 5 in the context of second order masking.

Whichever embodiment is envisaged above, the hardware architecture of the electronic equipment, such as the microcircuit 10, sometimes imposes the use of machine words on a particular number of bits, for example 8 bits, 16 bits or 32 bits. Thus when the output data consists of words with fewer bits, for example 4 bits, a plurality of output words S(M) is stored in a single machine word from the conversion table.

Figure 7:
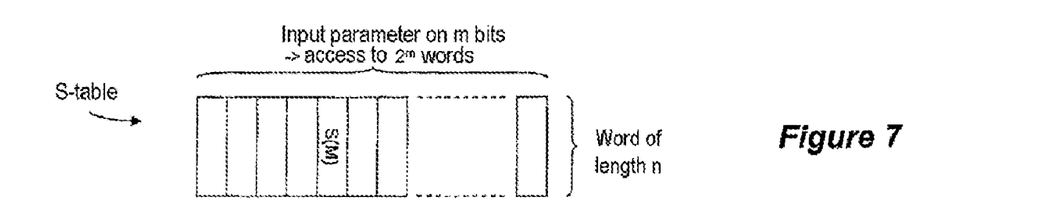
FIGS. 7 and 8 show one embodiment of the S-tables used in the embodiments of FIGS. 4 to 6.
Figure 8:
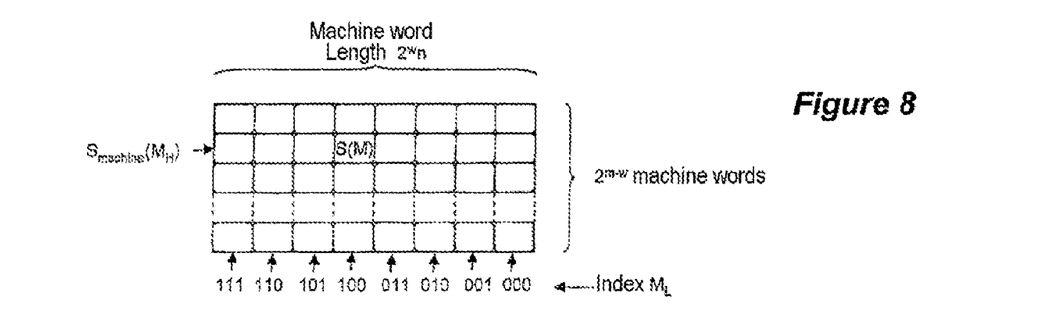

FIGS. 7 and 8 show this practical embodiment. In FIG. 7 there is seen the table S used hereinabove featuring $2^m$ output words of length n. In FIG. 8, the practical embodiment stores the output words of length n, here 2 bits, in machine words of length $2^w n$, here 16 bits (w is then equal to 3). Storing all the output words S(M) therefore requires only $2^{m-w}$ words, each storing $2^w$ output words S(M) (also referred to hereinafter as "sub-words"). This achieves efficient memory storage. The table S formed in this way comprises $2^{m-w}$ of length $2^w n$.

The output words are stored so that the word S(M) is accessed by selecting a machine word $S_{machine}(M_H)$ from the m-w most significant bits of M (hereinafter denoted $M_H$) and recovering the sub-word of the selected word on the basis of the w least significant bits of M (hereinafter denoted $M_L$). In particular $S_{machine}(M_H)=\{S(M_H,0), S(M_H,1), \ldots, S(M_H,2^w-1)\}$.

Another convention for decomposing the word M can equally be envisaged, for example selecting the machine word from the center bits of M and selecting the sub-word from the end bits of M (for example the most significant two bits and the least significant bit).

Figure 4:
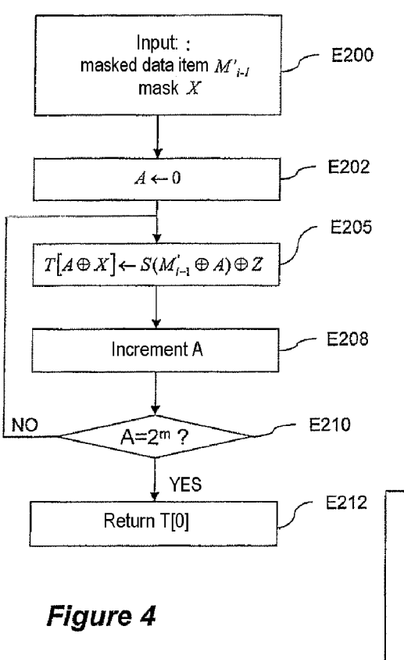
FIG. 4 represents in flowchart form a first embodiment of the invention implemented in the FIG. 3 process.

Given the above, the machine word $S_{machine}(M_H)$ can be read securely by applying the algorithms referred to above in connection with FIGS. 4 to 6 to the most significant parts of M' and its mask X.

Thus $S_{machine}(M_H)$ is recovered, possibly masked, as a function of $M'_{i-1,H}$, $A_H$ or $X_H$ ($X_{1,H}$ and $X_{2,H}$ in the event of double masking) (where the index H represents the m-w most significant bits).

Without output masking, there is recovered $S_{machine}(M_H)$.

With simple output masking using the mask Z, there is recovered $S_{machine}(M_H) \oplus Z$ (Z is of length m-w).

With double output masking using the masks $Z_1$ and $Z_2$, there is recovered $S_{machine}(M_H) \oplus Z_1 \oplus Z_2$ ($Z_1$ and $Z_2$ are of length m-w).

Higher orders of masking can equally be envisaged without making the mechanisms described hereinafter more complex.

On the other hand, there are available $M'_{i-1,L}$, $X_L$ ($X_{1,L}$ and $X_{2,L}$ in the event of double masking), which correspond to the identification bits of the output word within the machine word $S_{machine}(M_H)$, where applicable masked, read in the table T by the above algorithms.

Various mechanisms are described next with reference to FIGS. 9 to 11 for extracting efficiently, and where applicable in total security given the degrees of masking, the sub-word (i.e. output word) of index $M_{i-1,L}$ of the machine word $S_{machine}(M_H)$, where applicable output masked, from the masked index $M'_{i-1,L}$ and the masks $A_L$ or $X_L$ and where applicable $X_{1,L}$ and $X_{2,L}$.

To simplify the notation, from now on U (or U' if masked) denotes the machine word, j' the masked index, $r_j$ ($r_j1$ and $r_j2$) the masks of the index, $r_u$ ($r_u1$ and $r_u2$) the output masks where applicable masking the machine word U'. From now on the aim is to extract the sub-word U(j) from j' and the masks of j' (or to extract U'(j) and the corresponding output masks denoted $s_u$ ($s_u1$ and $s_u2$)), i.e. without manipulating j for security reasons.

These various mechanisms generally concern access to a sub-word of index j in a binary word (U, U') formed of $2^w$ sub-words $\{U(0), \ldots, U(2^w-1)\}$ from the binary index j' masked by a corresponding binary mask $r_j$ comprising:

i) a step of separation of said word (U, U') into two halves ($H_0(U)$, $H_1(U)$ $U_H$, $U_L$) respectively a more significant bit half and a less significant bit half, ii) at least one step of selection of a half of said word (U, U') as a function of the values of the bits with the same index in the index j' and the mask $r_j$, respectively.

Note that, depending on the value of the most significant bit of j, the sub-word to be accessed is either in the left-hand part (i.e. the more significant part) or in the right-hand part (i.e. in the less significant part) of U. Thus by combining use of the respective bits of the masked index and its mask (i.e. bits contributing to obtaining the corresponding bit of the index j not masked), efficiently selects the part of the word of interest without manipulating the demasked index j.

In particular, sub-words of the same length are chosen.

A first embodiment of these mechanisms is described with reference to FIG. 9 and using the word U=1010011101101101 composed of 8 sub-words with indices from 000 (most significant sub-word—on left) to 111 (least significant sub-word—on right). To be more precise, the requirement is to access the sub-word whose masked index j' has the value 101 and its mask $r_j$ 111 (remember that j'=j⊕$r_j$). Note that j=101⊕111=010, and it is thus required to access the sub-word 01 consisting of the fifth and sixth bits of U starting from the left.

This embodiment uses the following algorithm steps:
for k=0 to w−1
$(R_0, R_1) \leftarrow U$
$swap_{j'[k]}(R_0, R_1)$
$swap_{r_j[k]}(R_0, R_1)$
$U \leftarrow R_0$
return $R_0$ where $R_0$ and $R_1$ are two registers whose length is at least equal to the half-length of U, here at least 8 bits, and $swap_b$ $(R_0, R_1)$ is a function that swaps the contents of the two registers if b=0:

$$swap_b(R_0, R_1) = \begin{cases} NOP & \text{if } b = 0 \\ swap(R_0, R_1) & \text{if } b = 1 \end{cases}$$

Such a $swap_b$ function can be implemented by the following steps: tmp←$R_1$
$R_b \leftarrow R_0$
$R_{\bar{b}} \leftarrow tmp$ Alternatively, $swap_b$ can be implemented using the function Rotate(R,x) which effects a rightward or leftward rotation of R on x bits by $swap_b(R_0, R_1)$=Rotate(($R_0, R_1$), l+b.l) where l is the length of the registers. Here a single register R is used made up of two equal parts $R_0$ and $R_1$ so that bit shifting potentially shifts the bits from one part of the register R to the other.

As an alternative to using two registers, it is possible to use a double register (length 2l, here at least 16 bits) consisting of two parts.

In the step E600, a counter k is initialized to 0.

In the step E602, the two registers $R_0$ and $R_1$ are respectively assigned $U_H$ (10100111) and $U_L$ (01101101).

In the step E604, the $swap_b$ function is applied as a function of the most significant bit of the index j'={j'[0], j'[1], . . . , j'[w−1]}:
j'[k=0]=1.

Thus here the following two registers are swapped: $R_0$=01101101 and $R_1$=10100111.

In the step E606, the $swap_b$ function is applied again as a function of the bit with the same index k, and thus the most significant bit, of the mask $r_j$: $r_j$[k=0]=1.

Thus here the following two registers are swapped: $R_0$=10100111 and $R_1$=01101101.

In the step E608 the content of the register $R_0$ replaces the value of U.

In the step E610, the iteration value k is incremented: k=1.

In the step E612, k is compared with w (here w=3). As k<3, there is a return to the step E602, placing the new value of U in the two registers: $R_0$=1010 and $R_1$=0111.

As j'[k=1]=0 and $r_j$[k=1]=1, only one permutation of the two registers is effected during the step E606: $R_0$=0111 and $R_1$=1010.

Thus in the step E608 there is retained U=0111.

In the step E612, k=2, so there is a return to the step E602. The iteration k=2 yields $R_0$=01 and $R_1$=11 because two permutations have been effected in the steps E604 and E606.

In the step E612, k=3=w, so the next step is the step E614 which returns U=01. Thus the expected sub-word is indeed obtained.

Note that on each iteration the size of U decreases by half and there is therefore a convergence by dichotomy toward the required sub-word.

The security of this mechanism is assured by the application of the permutation functions (interchanging of the two registers) on all iterations (with different parameters) even if no permutation results therefrom.

Generally speaking, the permutation (swap) operation as envisaged hereinabove, when used conditionally, confers a high degree of security when it is a question of identifying one of two elements (for selection or isolation, for example). In this respect, protection of this approach could be envisaged independently of the other teachings of the present application.

Note that using indexing of j' (and its masks) not from left to right but from right to left it is necessary to proceed to an additional permutation (swap) within each of the iterations k.

To provide first order protection for masking the data, the embodiment described above can be extended to the data item U' masked using a random mask $r_u$. In this case, the aim is to determine not only the appropriate sub-word of U' (as described above) but also the corresponding sub-word of $r_u$.

Access to the sub-word $r_u$(j) from the machine word $r_u$ is similar to the above mechanism.

In each of the iterations k, just after the step E608, the steps E602', E604', E606' and E608' similar to those with the corresponding number E602, E604, E606 and E608 are applied to the mask $r_u$.

The algorithm proposed hereinabove then becomes:
for k=0 to w−1
$(R_0, R_1) \leftarrow U'$
$swap_{j'[k]}(R_0, R_1)$
$swap_{r_j[k]}(R_0, R_1)$
$U' \leftarrow R_0$
$(R_0, R_1) \leftarrow r_u$
$swap_{j'[k]}(R_0, R_1)$
$swap_{r_j[k]}(R_0, R_1)$
$r_u \leftarrow R_0$
return (U', $r_u$)

At the end of the algorithm (step E614) there are obtained the values U' and $r_u$ corresponding to the required sub-words, such that U'=U⊕$r_u$, where U is the output value (of the S-box) that is not masked.

A more secure embodiment is described next with reference to FIG. 10 using double masking of the values, both for the index j' (masks $r_j$1 and $r_j$2) and for the word U' (masks $r_u$1 and $r_u$2), for example resulting from the above step E414 applied to the determination of $S_{machine}(M_H)$. The double masking can of course be applied independently.

Figure 9:
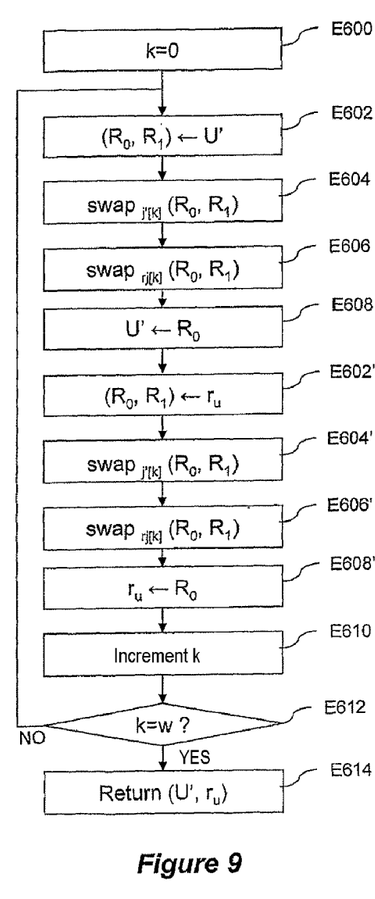
FIG. 9 represents in flowchart form a first embodiment of a process for accessing a sub-word of a binary word, for example stored in the FIG. 8 S-table.
Figure 10:
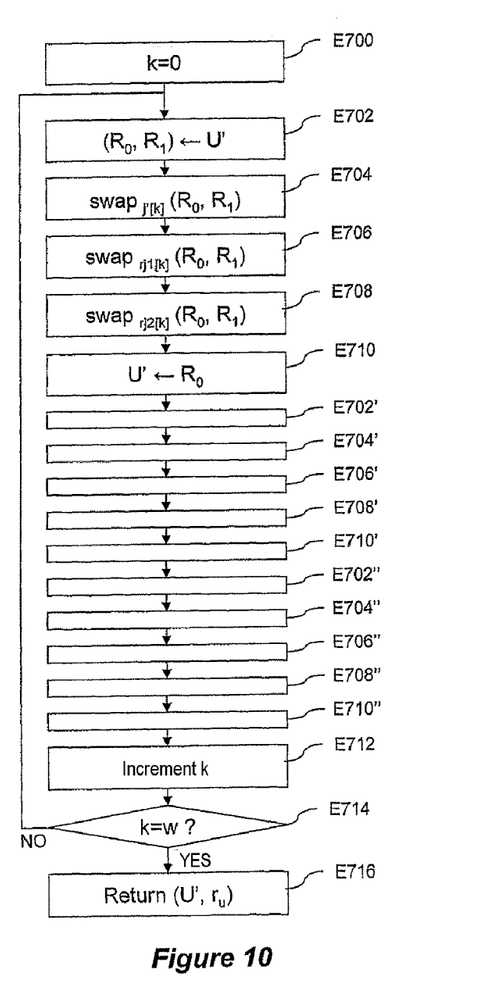
FIG. 10 represents in flowchart form a second embodiment of a process for accessing a binary word, for example stored in the FIG. 8 S-table.

This embodiment differs from that of FIG. 9 essentially by the application of the swap function three times as a function of corresponding bits in the index j' and each of the two masks $r_j$1 and $r_j$2 (note therefore that the invention can easily be extended to higher orders of masking by effecting a number of permutations equal to 1+the number of masks of j) and by the determination of the sub-words in the word U' and in each of the masks $r_u$1 and $r_u$2 of U. For homogeneous security, it is necessary to choose the same degree of masking for the index j and for the binary word U.

The steps E700 to E704 do not differ from the steps E600 to E604.

Because there are two masks with indices $r_j1$ and $r_j2$, two conditional permutations are effected in the steps E706 and E708, respectively indexed on the corresponding two bits of the two masks $r_j1[k]$ and $r_j2[k]$.

The step E710 is the same as the above step E608.

In the same iteration, there are calculated in a similar way the two mask parts $r_u1$ and $r_u2$ corresponding to the steps E702' to E710' and E702" to E710".

In the step E712, k is incremented to form w iterations (comparison in step E714).

The step E716 returns U', $r_u1$ and $r_u2$ representing the required sub-words (and thus the required output values from the table S) of the initial words. These three values satisfy the condition: $U'=U \oplus r_u1 \oplus r_u2$.

Figure 11:
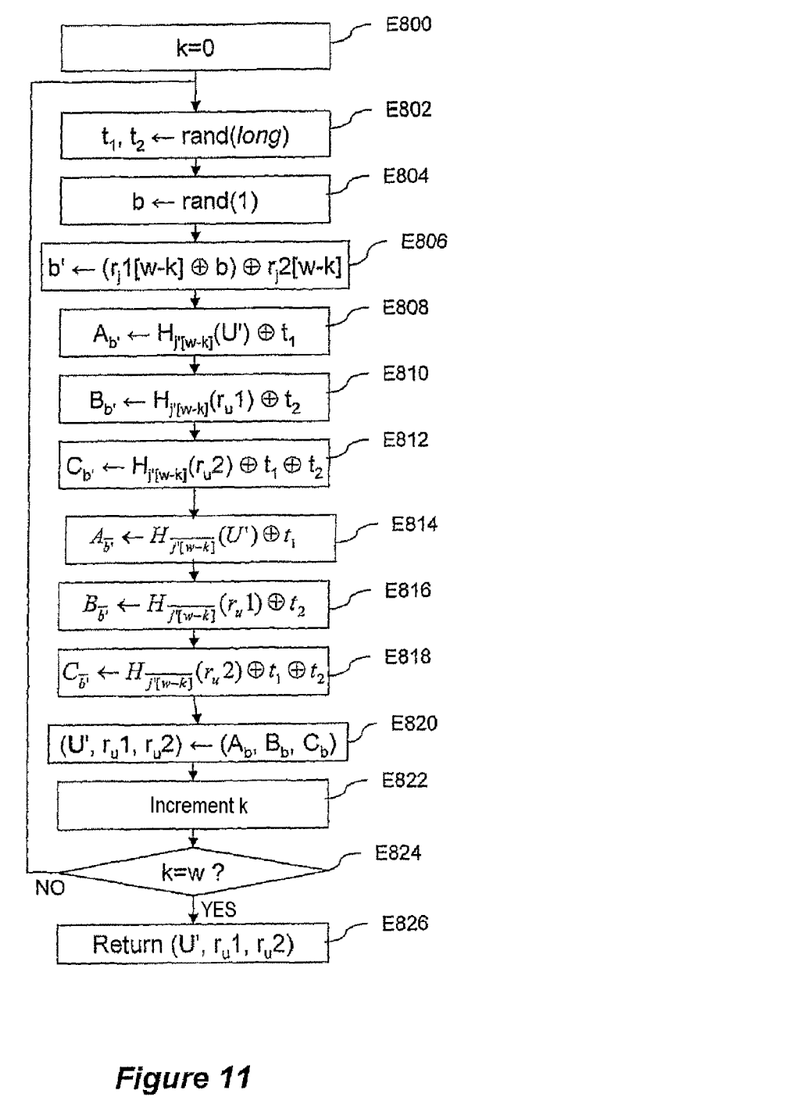
FIG. 11 represents in flowchart form a third embodiment of a process for accessing a sub-word of a binary word, for example stored in the FIG. 8 S-table.

To enhance security further, particularly through avoiding use of the intermediate variables U' and U'(j) that constitute a potential weakness because of the dependence on the index j, the following mechanism described with reference to FIG. 11 is proposed.

Although described with reference to double masking, the mechanism applies to simple masking even in the absence of masking of the word U.

There are first defined the two functions $H_0(y)$ and $H_1(y)$ that respectively return the more significant bit half of y and the less significant bit half of y. These two functions are easily implemented using the $swap_b$ function referred to above, for example as follows:

$H_b(y): (R_0, R_1) \leftarrow y$
$swap_b(R_0, R_1)$
return $R_0$

The mechanism for access to the sub-word of index j can be implemented using the following instructions: for k=0 to w−1

$(U',r_u1,r_u2) \leftarrow Select(2^{w-1-k}n,(U',r_u1,r_u2),(j'[w-k],r_j1[w-k],r_j2[w-k]))$ return $(U',r_u1,r_u2)$ where the function Select receives as a parameter a dimension long ($2^{w-1-k}n$ representing the size of one half of the word U', $r_u1$ and $r_u2$ to be recovered at the end of the iteration concerned), a first triplet of a masked word and the two associated masks, and a second triplet of a masked bit (here the bit of index w−k of the index j) and the two associated masks, and returns a triplet (U', $r_u1$, $r_u2$) satisfying the condition: $U' \oplus r_u1 \oplus r_u2 = H_{j[w-k]}(U)$.

It can thus be seen that by iterating this function for each of the bits constituting the index j the halves of the word corresponding to the various bits of the index j are successively isolated to end up with the sub-word of U' of index j accompanied by the sub-words of the corresponding mask.

Note also that application of this mechanism to simple masking involves doublets and not triplets (equally extensible to q masks and q-tuplets).

In the step E800, an iteration value k is initialized to 0.

Steps E802 to E820 illustrate one embodiment of the Select function.

Two random masks of length long=$2^{w-1-k}n$ are generated in the step E802.

A random Boolean b is generated in the step E804.

A masked bit is calculated in the step E806 from the Boolean b and the bits of index k (from the most significant bit to the least significant bit progressively through the iterations) in the respective two masks of index j': $b' \leftarrow (r_j1[w-k] \oplus b) \oplus r_j2[w-k]$.

The XOR operations must be executed in this step in the order of the parentheses, namely first $r_j1[w-k] \oplus b$, then addition of the result and the Boolean $r_j2[w-k]$. Complying with this order guarantees protection against second order attacks because the value $r_j1[w-k] \oplus r_j2[w-k]$ that could be seen as a simple mask protecting the bit j[w-k] only by first order masking is not manipulated directly.

For the subsequent steps E808 to E818 (which can be interchanged with each other because they are independent), three pairs of addressable registers are used, hereinafter denoted $A_0$, $A_1$ (assigned to the word U), $B_0$, $B_1$ (assigned to the first mask of U), and $C_0$ and $C_1$ (assigned to the second mask of U).

There are assigned successively:
to the register A indexed by b' calculated in the step E806, the part $H_{j'[w-k]}(U')$ masked by a mask ($t_1$) that is one of the random masks generated in the step E802:

$A_b \leftarrow H_{j'[w-k]}(U') \oplus t_1$ to the other register A, the other part of U' masked by the same mask.

The same procedure is applied to the two masks $r_u1$ and $r_u2$, respectively using the other mask $t_2$ and the combination of the two masks $t_1$ and $t_2$, and are stored in pairs in $B_0$, $B_1$, $C_0$ and $C_1$, respectively.

At this stage it could be shown that for the above index 'w-k', regardless of the values of the two masks $r_j1[w-k]$ and $r_j2[w-k]$, we have:

$(A_b, B_b, C_b) = H_{j[w-k]}(U') \oplus t_1, H_{j[w-k]}(r_u1) \oplus t_2, H_{j[w-k]}(r_u2) \oplus t_1 \oplus t_2)$ $(A_{\bar{b}}, B_{\bar{b}}, C_{\bar{b}}) = (H(U') \oplus t_1, H(r_u1) \oplus t_2, H(r_u2) \oplus t_1 \oplus t_2)$ and the values stored in the registers satisfy the following condition:

$A_b \oplus B_b \oplus C_b = H_{j[w-k]}(U)$.

Because of the independence of these values from those of $r_j1$ and $r_j2$, independence relative to the index j is achieved, which enhances security.

Thus in the step E820 ($A_b$, $B_b$, $C_b$) are substituted for the preceding values (U', $r_u1$, $r_u2$).

k is then incremented in the step E822.

The step E824 compares k and w to determine if iteration is to be stopped (these steps are similar to the above steps E612 and E714, with a return to the step E802 for a new iteration).

At the end of the iterations (step E826), there are returned (U', $r_u1$, $r_u2$) which respectively correspond to the required masked sub-word and to the two masked sub-words for demasking the sub-word U' obtained: $U' \oplus r_u1 \oplus r_u2 = U$.

Using the random parameters $t_1$, $t_2$ and b is not essential. It nevertheless guarantees algorithm security because, on the one hand, it protects the values manipulated by double masking ($t_1$ and $t_2$, which can be reduced to simple masking if necessary) and, on the other hand, assigns the required result arbitrarily to one or the other of the two registers indexed on b. In the absence of b, the step E826 returns $A_0$, $B_0$ and $C_0$. In the absence of $t_1$ and $t_2$, the parameter long is not necessarily in the Select function indicated above.

In the mechanisms described above with reference to FIGS. 9 to 11, the values j'[k], $r_j[k]$, $r_j1[k]$ and $r_j2[k]$ have symmetrical roles so that interchanging their positions in these mechanisms can be envisaged, for example the value b' in the step E806 can use j' instead of the mask $r_j1$ and the functions H of the steps E808 and E814 are then indexed by the mask $r_j1$.

These mechanisms provide secure access to a sub-word of a word, particularly a masked word, made up of a plurality of sub-words, using an index that is also masked.

The foregoing examples are merely embodiments of the invention, which is not limited to them.

The invention claimed is:

1. A method of cryptographic processing of data represented in digital form, the method being executed by an electronic entity and comprising a transformation of an input data item masked by an input mask into an output data item, said transformation using a conversion table comprising:
   for a plurality of possible values for the input mask, transferring an output value corresponding, in the conversion table to the masked input data item transformed by application of a demasking operation by a possible value of the plurality of possible values, into a second table at a position corresponding to a particular value masked by the input mask and transformed by application of the demasking operation by the possible value;
   determining the output data item by a table data item situated in the second table at the position corresponding to the particular value.

2. A computer program product enabled in a non-transitory medium, the computer program product comprising a series of instructions adapted, when they are executed by a microprocessor, to execute the method according to claim 1.

3. An electronic device for cryptographic processing of data represented in digital form, adapted to effect a transformation of an input data item masked by an input mask into an output data item by a conversion table, comprising:
   means for transferring, for a plurality of possible values for the input mask, an output value corresponding, in the conversion table to the masked input data item transformed by application of a demasking operation by the possible value, into a second table at a position corresponding to a particular value masked by the input mask and transformed by application of the demasking operation by means of the possible value;
   means for determining the output data item by a table data item situated in the second table at the position corresponding to the particular value.

4. The electronic device according to claim 2, wherein the conversion table defines a non-linear function.

5. The electronic device according to claim 2, wherein the input mask is a first order mask.

6. The electronic device according to claim 2, wherein the input mask is a second order mask.

7. The electronic device according to claim 6, comprising:
   means for masking the particular value by a first mask element;
   means for masking the particular value by a second mask element.

8. The electronic device according to claim 2, wherein the means for transferring comprise means for masking the transferred output value by an output mask.

9. The electronic device according to claim 8, wherein the output mask is a second order mask.

10. The electronic device according to claim 9, wherein the means for masking comprise:
    first means for masking subunit using a first random value;
    second means for masking subunit using a second random value.

11. The electronic device according to claim 2, wherein the means for transferring act for all of the possible values for the input mask.

12. The electronic device according to claim 2, wherein the particular value is a predetermined value.

13. The electronic device according to claim 2, comprising means for obtaining the particular value by random drawing.

14. The electronic device according to claim 2, wherein the input mask is an additive mask.

15. The electronic device according to claim 14, wherein the input mask is a Boolean mask.

16. The electronic device according to claim 2, wherein said table data item is a word comprising a plurality of output sub-words and wherein the means for determining of the output data item comprise means for accessing the output data item among the plurality of output sub-words by a portion of the input data item and a portion of the input mask.

17. The electronic device according to claim 16, wherein the means for access to the output data item comprise:
    (i) means for separating said word into two halves of more significant bits and less significant bits, respectively,
    (ii) means for selecting one of said halves of said word as a function of bit values of bits of a same index in the portion of the input data item and the portion of the input mask, respectively.

18. A microcircuit card comprising the electronic device according to claim 2.

19. An electronic device for cryptographic processing of data represented in digital form, adapted to effect a transformation of an input data item masked by an input mask into an output data item by a conversion table, comprising:
   a transferring subunit constructed and arranged to transfer, for a plurality of possible values for the input mask, an output value corresponding, in the conversion table to the masked input data item transformed by application of a demasking operation by a possible value of the plurality of possible values, into a second table at a position corresponding to a particular value masked by the input mask and transformed by application of the demasking operation by the possible value;
   a determining subunit constructed and arranged to determine the output data item by a table data item situated in the second table at the position corresponding to the particular value.

* * * * *